United States Patent [19]

Sakuma et al.

[11] Patent Number: 5,184,888
[45] Date of Patent: Feb. 9, 1993

[54] ILLUMINATING PORTION OF VANITY MIRROR

[75] Inventors: Toranosuke Sakuma; Minoru Obata, both of Shimizu, Japan

[73] Assignee: Koito Manufacturing Co., Ltd., Tokyo, Japan

[21] Appl. No.: 607,449

[22] Filed: Oct. 31, 1990

[30] Foreign Application Priority Data

Jan. 23, 1990 [JP]  Japan .................................. 2-12962
Jun. 29, 1990 [JP]  Japan ................................. 2-171681

[51] Int. Cl.$^5$ ........................... F21V 33/00; B60J 3/00
[52] U.S. Cl. .................................... 362/136; 362/31; 362/268; 362/330; 362/83.1; 359/844; 296/97.2
[58] Field of Search ............... 362/136, 26, 31, 33, 362/97, 330, 32, 268, 83.1; 350/171; 359/844 X; 296/97.2

[56] References Cited

U.S. PATENT DOCUMENTS

| | | |
|---|---|---|
| 3,211,903 | 10/1965 | McElreath . |
| 4,174,864 | 11/1979 | Viertel et al. ..................... 362/144 |
| 4,203,149 | 5/1980 | Viertel et al. ..................... 362/144 |
| 4,277,817 | 7/1981 | Hehr ................................ 362/31 |
| 4,364,597 | 12/1982 | Viertel et al. ..................... 362/137 |
| 4,479,172 | 10/1984 | Connor ............................ 362/135 |
| 4,764,852 | 8/1988 | Sakuma ........................... 362/135 |
| 4,779,166 | 10/1988 | Tanaka et al. ................... 362/31 |
| 4,791,540 | 12/1988 | Dreyer, Jr. et al. ............. 362/331 |
| 4,792,884 | 12/1988 | Suman et al. ................... 362/135 |
| 4,937,709 | 6/1990 | Yanagi et al. ................... 362/31 |
| 5,055,978 | 10/1991 | Rogoff ............................. 362/31 |

Primary Examiner—Ira S. Lazarus
Assistant Examiner—L. Heyman
Attorney, Agent, or Firm—Koda and Androlia

[57] ABSTRACT

An illuminating portion of a vanity mirror device disposed in a recessed portion in a body of the vanity mirror device and at one side of a mirror. A light conducting plate formed of a transparent material is fitted in the recessed portion and the front surface of the light conducting plate is located flush with the front surface of the body. And an electric bulb is located to oppose one of end surfaces of the light conducting plate.

2 Claims, 12 Drawing Sheets

ILLUMINATING PORTION OF VANITY MIRROR

FIELD OF THE INVENTION

The present invention relates to a vanity mirror for mounting on a vehicle such as an automobile and, particularly to an illuminating portion of the vanity mirror which reduces the number of parts and the thickness in the force and aft directions.

DESCRIPTION OF PRIOR ART

There are various types of vanity mirrors having an illuminating portion aside of a mirror. One of them comprises a recessed portion formed aside of the mirror, with an electric bulb being disposed in the recessed portion and the front surface of the recessed portion being covered by a lens. Another prior art vanity mirror comprises a recessed portion aside of the mirror, a lamp and a plate-like light conducting plate disposed in the recessed portion with one side surface of the conducting plate facing the lamp.

In the prior art device having in the recessed portion an electric bulb, it is required to arrange a socket for retaining the electric bulb to project from the rear end surface of the recessed portion in the forward direction so as to attain the uniformity in the illuminance which increases the thickness in the force and aft directions.

When the light conducting plate is provided, it is required to provide separately a lens for covering the front surface of the recessed portion and to provide a structure for supporting the light conducting plate in the recessed portion which increases the number of parts and complicates the construction.

The light conducting plate has been made of acrylate resin or of polycarbonate resin. The acrylate resin is advantageous in high degree of transparency and in good formability, but is inferior in heat resisting property such that when an electric bulb of high power is used it is required to form a large space between the bulb and the conducting plate or to provide a suitable heat dissipating means.

The polycarbonate resin can solve the problems in the acrylate resin, however, the illuminance is inferior as compared with the acrylate resin, and ultraviolet light absorbing agent for improving the heat resisting property acts to color with a tinge of blue. Further, according to poor formability there is a tendency that so-called flow mark is formed along the flow of the resin during the injection molding process which impairs the uniformity in the illuminance.

SUMMARY OF THE INVENTION

An object of the invention is to avert above mentioned shortcomings and, according to the invention, there is provided an illuminating portion of a vanity mirror device comprising a recessed portion in a body of the device and at one side of a mirror, a light conducting plate formed of a transparent material being fitted in the recessed portion with the front surface of the light conducting plate being located flush with the front surface of the body, and an electric bulb being located to oppose one of end surfaces of the light conducting plate.

Thus, according to the invention, the thickness in the fore an aft directions can be minimized since the light conducting plate is disposed in the recessed portion with the electric bulb facing one side surface of the light conducting plate. Further, since the front surface of light conducting plate is exposed to the front surface of the body it is possible to omit the lens which is advantageous in reducing the number of parts.

According to a preferred embodiment of the invention, there is provided a decorative panel having therein a large opening and being detachably mounted on the body so as to be located in the recessed portion, with the light conducting plate being retained in the opening in the decorative panel and supported therein such that the front surface of the light conducting plate is exposed to the outside.

Preferably, a reflective sheet is mounted on the rear surface of the light conducting plate.

Preferably, the electric bulb is a tubular bulb, and a reflective mirror is disposed to surround the tubular bulb so that large portion of the light emitted from the bulb can be conducted to inject into the light conducting plate whereby the light emitted from the bulb can be utilized effectively.

Further, it is possible to provide a decorative panel having a large opening and adapted to be located in a front opening of the recessed portion and detachably mounted on the body, with the light conducting plate being retained on the decorative panel by mutually engaging retaining portions formed respectively thereon such that the front surface of the light conducting plate is exposed to the outside through the opening in the decorative panel, and by mounting the decorative panel retaining thereon the light conductive plate on the body such that the light conducting plate is located in the recessed portion, then, it is not required to provide separately a structure for supporting the light conducting plate in the recessed portion which enables to simplify the construction, to control an assembly of the decorative panel and the light conducting plate as a single component thereby it is easy in transportation, storage and the like and the space for controlling the parts can be reduced to the minimum.

Further, by providing a reflective sheet on the rear surface of the light conducting plate, the light emitted from the electric bulb can be utilized effectively.

Further, by forming the electric bulb as a tubular bulb and providing a reflective mirror so as to surround a portion of the bulb not facing the end surface of the light conducting plate it is possible to further utilize the light emitted from the bulb.

According to another feature of the invention, there is provided an illuminating portion of a vanity mirror including a light conducting plate and an electric bulb being disposed facing one side surface of the conducting plate, with the light conducting plate receiving the light injected from the bulb and conducting the light in the forward direction, wherein the light conducting plate is formed of a light source facing portion and a remaining light emitting portion, with the light source facing portion being formed of a thermoplastic synthetic resin material of a high degree of heat resistance and the light emitting portion being formed of a thermoplastic synthetic resin material of high degree of transparency and good moldability. Thus, it is possible to afford desired illuminance, good appearance and good heat resisting characteristics.

BRIEF DESCRIPTION OF THE DRAWINGS

Further objects and effects of the invention will become apparent from the following detailed description in conjunction with the drawings, in which.

DETAILED DESCRIPTION OF PREFERRED EMBODIMENTS

First Embodiment (FIG. 1 through FIG. 9)

Shown at numeral 1 is a vanity mirror which is mounted fittingly in a recessed portion formed in a sun visor 2 which, in turn, is mounted in a driver's compartment of an automobile.

Body

Figure 9:
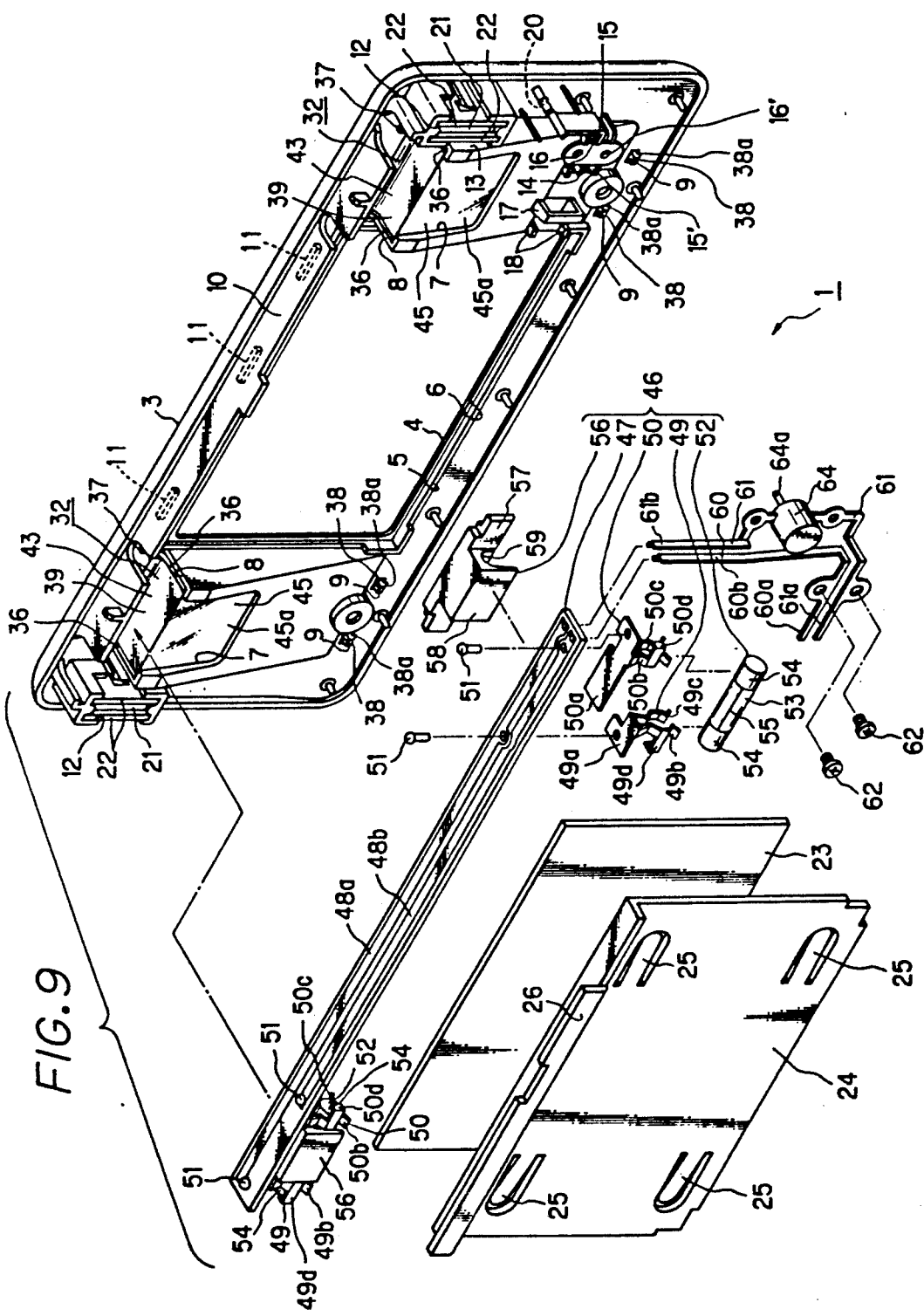
FIG. 9 is partially broken perspective rear view of the vanity mirror of FIG. 1.

A body 3 of the vanity mirror 1 has a sidewisely elongated generally rectangular plate-like shape having a sidewisely elongated large window 4 and is formed of a suitable thermoplastic synthetic resin material. A ridge 5 is formed on the rear surface of the body 3 as shown in FIGS. 4 and 9 to surround the window 4 with a small space formed therebetween to define a receiving edge 6.

Vertically elongated recessed portions 7 are formed in the body 3 on opposite sides of the window 4. The recessed portions 7 open respectively in the forward direction and, as shown in FIGS. 4 and 5, the depth of the recessed portions decreased gradually in the downward direction. There are formed cutouts 8 formed respectively in the upper end portions of the recessed portions 7 to open in upward, rearward and opposite sides directions. Engaging openings 9 are formed along the lower end portions of the recessed portions 7.

Figure 7:
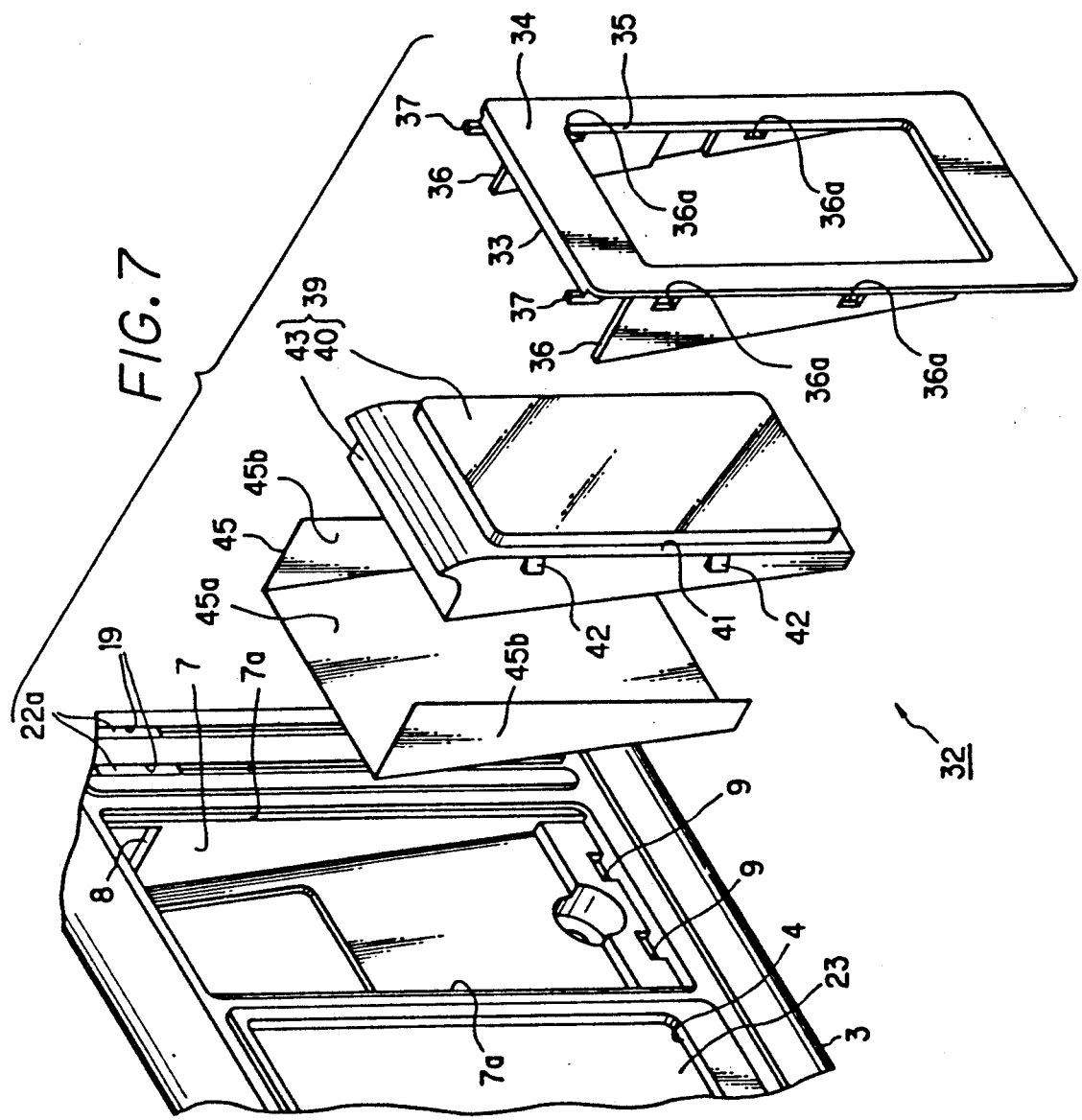
FIG. 7 is an exploded perspective view of another essential portion of the vanity mirror of FIG. 1.
Figure 8:
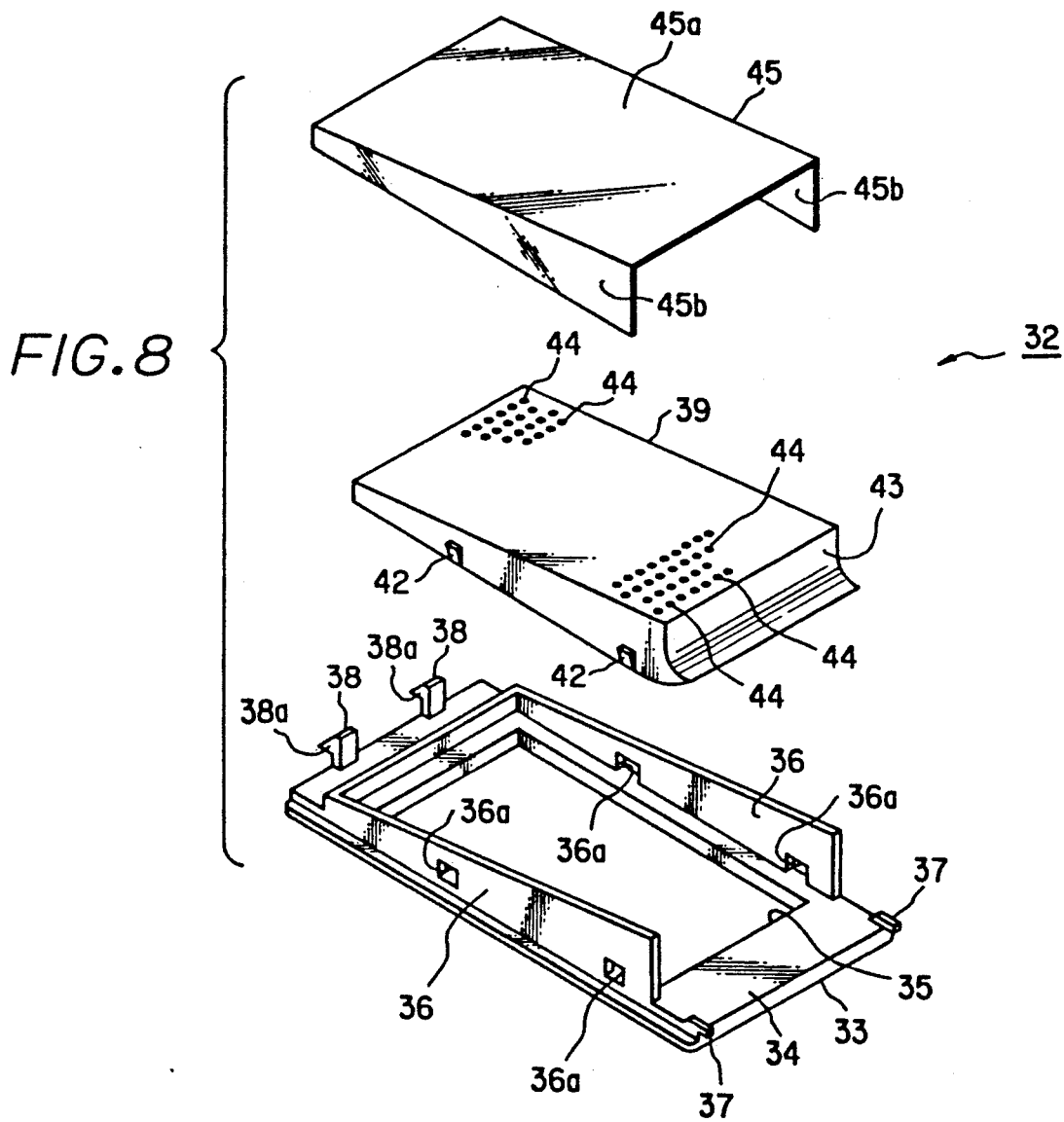
FIG. 8 is an exploded perspective view of a further essential portion of the vanity mirror of FIG. 1.

As shown in FIG. 7, there are formed seating edges 7a in opposite side edges of front openings of the recessed portions 7 by forming shallow grooves.

Figure 3:
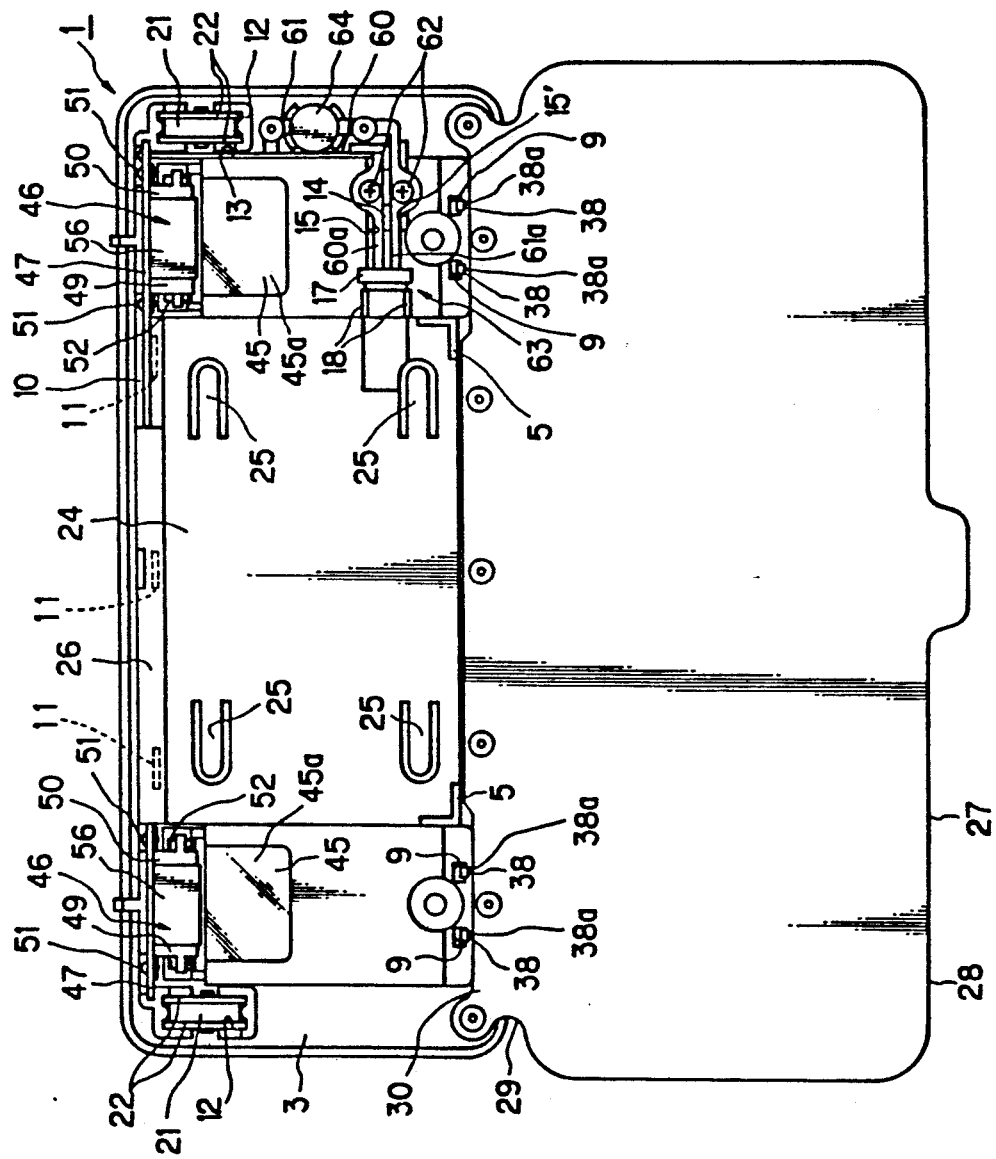
FIG. 3 is rear view of the vanity mirror of FIG. 1.
Figure 4:
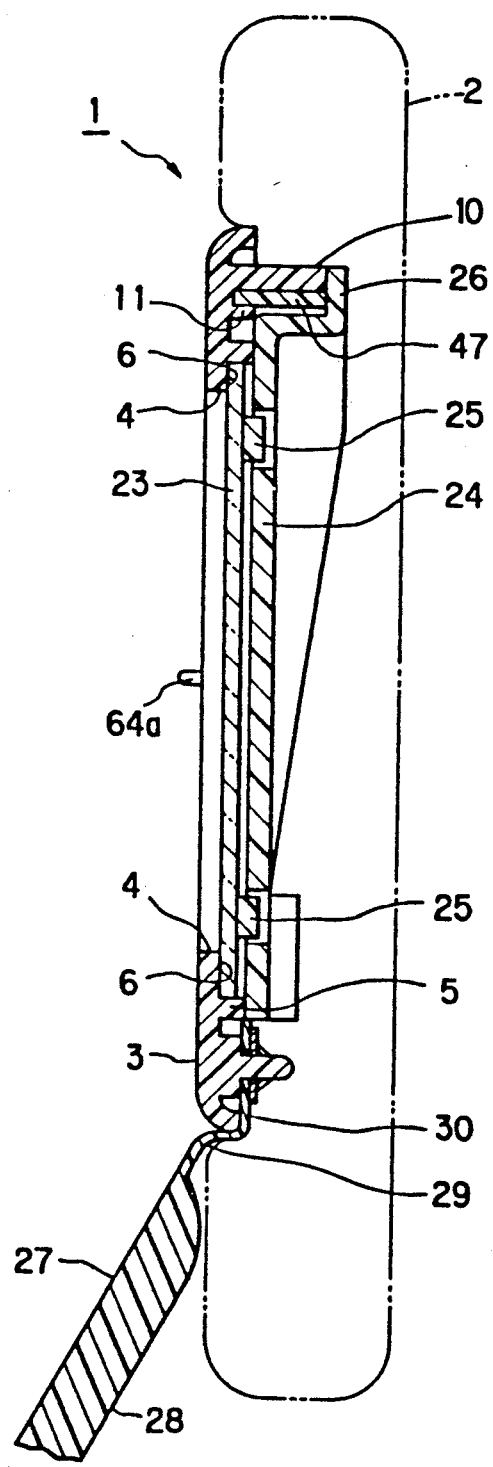
FIG.4 is an enlarged section view taken generally along line N—N in FIG. 2.
Figure 5:
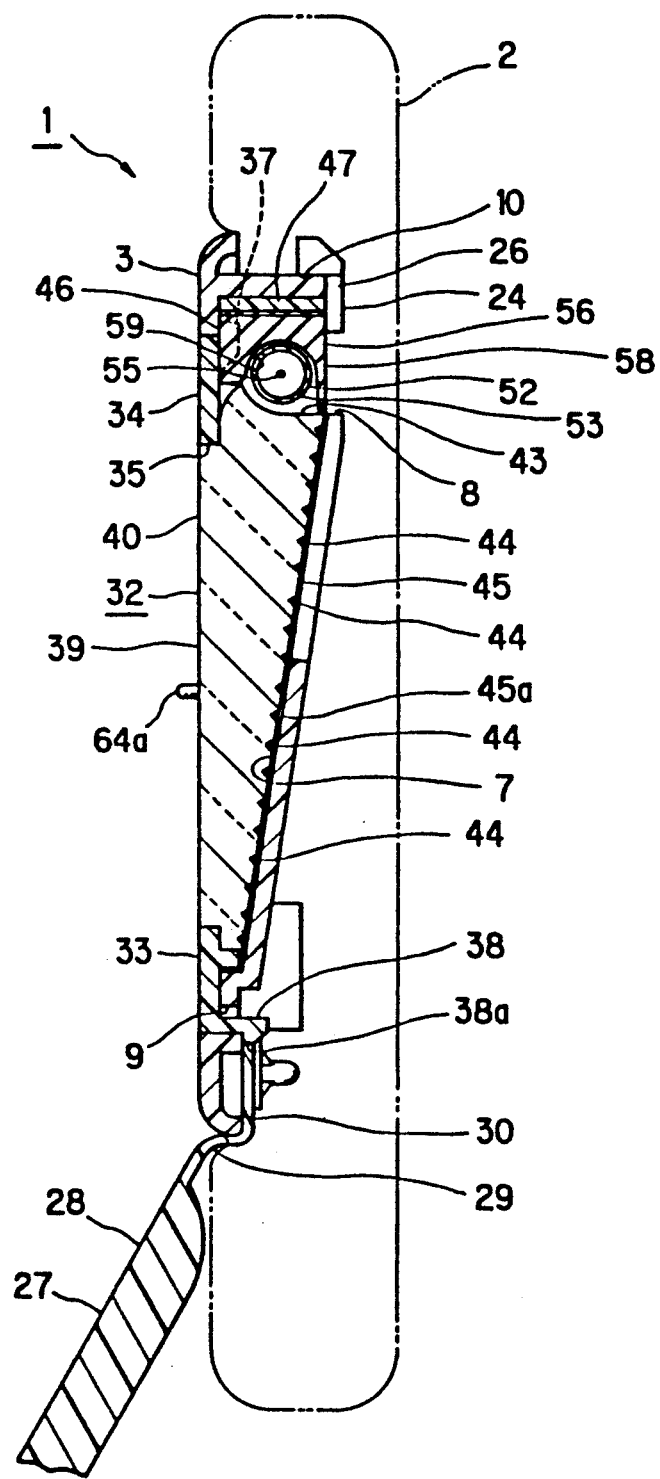
FIG. 5 is an enlarged section view taken generally along line V—V in FIG. 2.

There is formed integrally on the rear surface of the body 3 and along the upper edge a transversely extending wall 10, and a plurality of ridges are formed integrally on the rear surface of the body 3 and between the wall 10 and upper portion of ridge 5 as shown in FIGS. 3 and 4.

Magnet receiving recesses 12 are formed in the rear surface of the body 3 by forming walls on left and right upper end portions respectively, and a small space 13 is formed between the recess 12 of the rightside in the rear view and the outside surface of the recessed portion 7 as shown in FIGS. 3 and 9.

Shown at numeral 14 in FIGS. 3 and 9 is a projecting portion formed at the position on generally right half portion and near to the lower end of the rear surface of the recessed portion 7 of the rightside in the rear view and has transversely extending and vertically aligning grooves 15 and 15'. There are formed prepared holes 16 and 16' in generally central portions of the grooves 15 and 15' respectively.

Shown at 17 in FIG. 9 is a gate-shaped or inverted channel shaped projection formed on the rear surface of the recessed portion 7 of the rightside in the rear view and spaced leftward from the projecting portion 14, and at 18 are projecting portions spaced in vertical directions and leftward of the gate-shaped projection 17.

Figure 2:
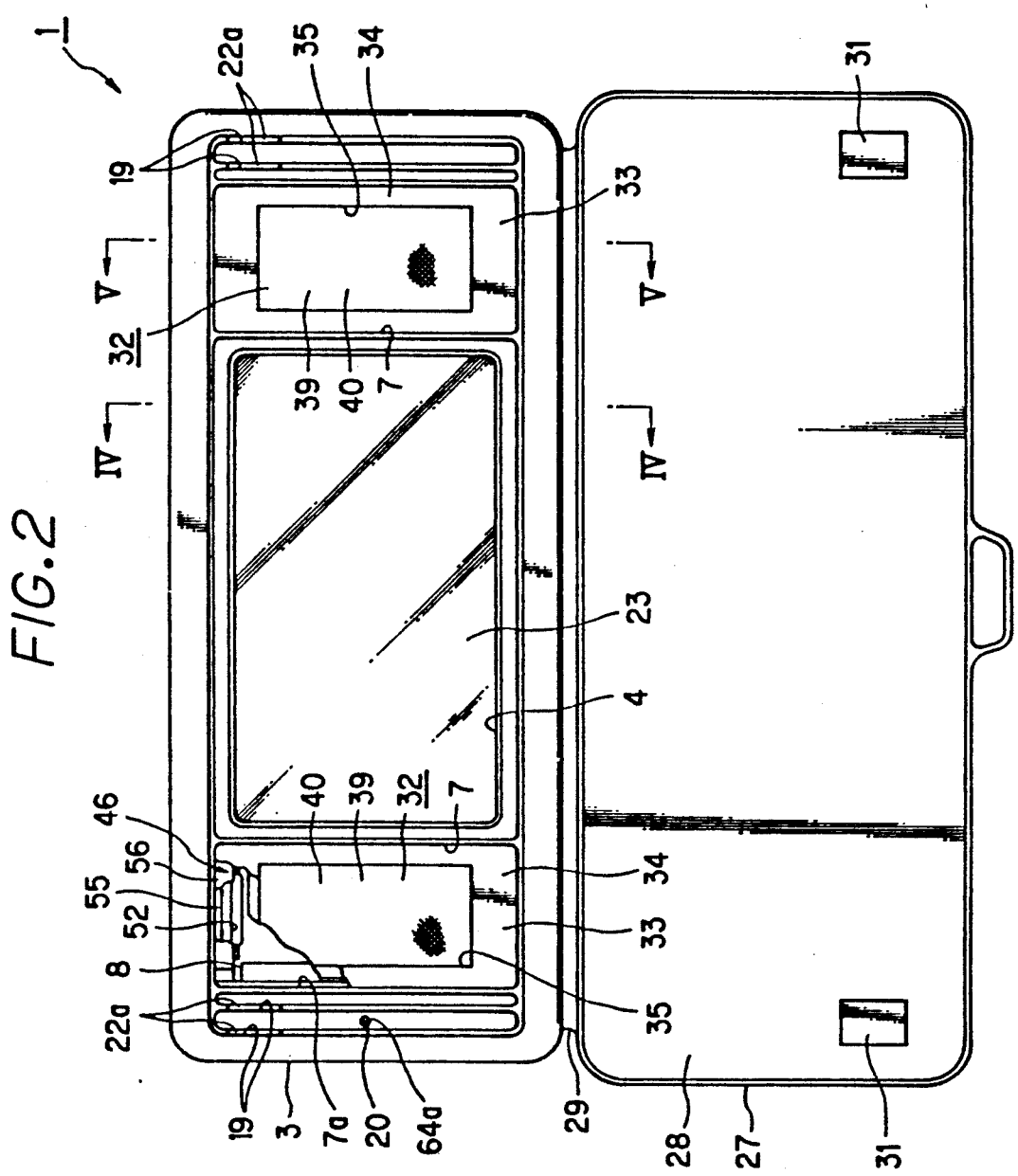
FIG. 2 is a partially broken front view of the vanity mirror of FIG. 1.

Shown at numerals 19 are vertically extending slits formed in portions corresponding with the magnet receiving recesses 12 and at 20 is an inserting opening formed in the recess 7 of rightside in the rear view as shown in FIGS. 2 and 9.

In the magnet receiving recesses 12 there are disposed magnets 21 and yoke plates 22 for clamping the magnets 21; with the tip ends 22a of the yoke plates 22 being exposed to the front side of the body 3 through the slits 19 respectively.

Mirror

Shown at numeral 23 is a generally rectangular mirror being located to cover the window 4 of the body 3 from the rear, with the circumferential portion engaging with the receiving edge 6 around the window 4.

A back cover 24 formed of a thermoplastic synthetic resin material is mounted on the rear surface of the body 3 by fusion welding, such that the mirror 23 is clamped between the body 3 and the back cover 24.

The back cover 24 has integrally resilient pieces 25 for resiliently engaging with the rear surface of the mirror 23.

Further, the back cover 24 has integrally on the upper end a generally L-shaped retaining portion 26, as shown in FIG. 4, with the upper edge of the retaining portion 26 abuts with the rear end of the wall 10 of the body 3.

Front Cover

A front cover 27 including integrally a cover portion 28 adapted to cover the front surface of the body 3 and a mounting portion 30 connected to the lower edge of the cover portion 28 through a hinge portion 29 is provided to selectively cover the front surface of the body 3.

The mounting portion 30 is secured to the rear surface of the lower end of the body 3 as shown in FIG. 4.

Figure 1:
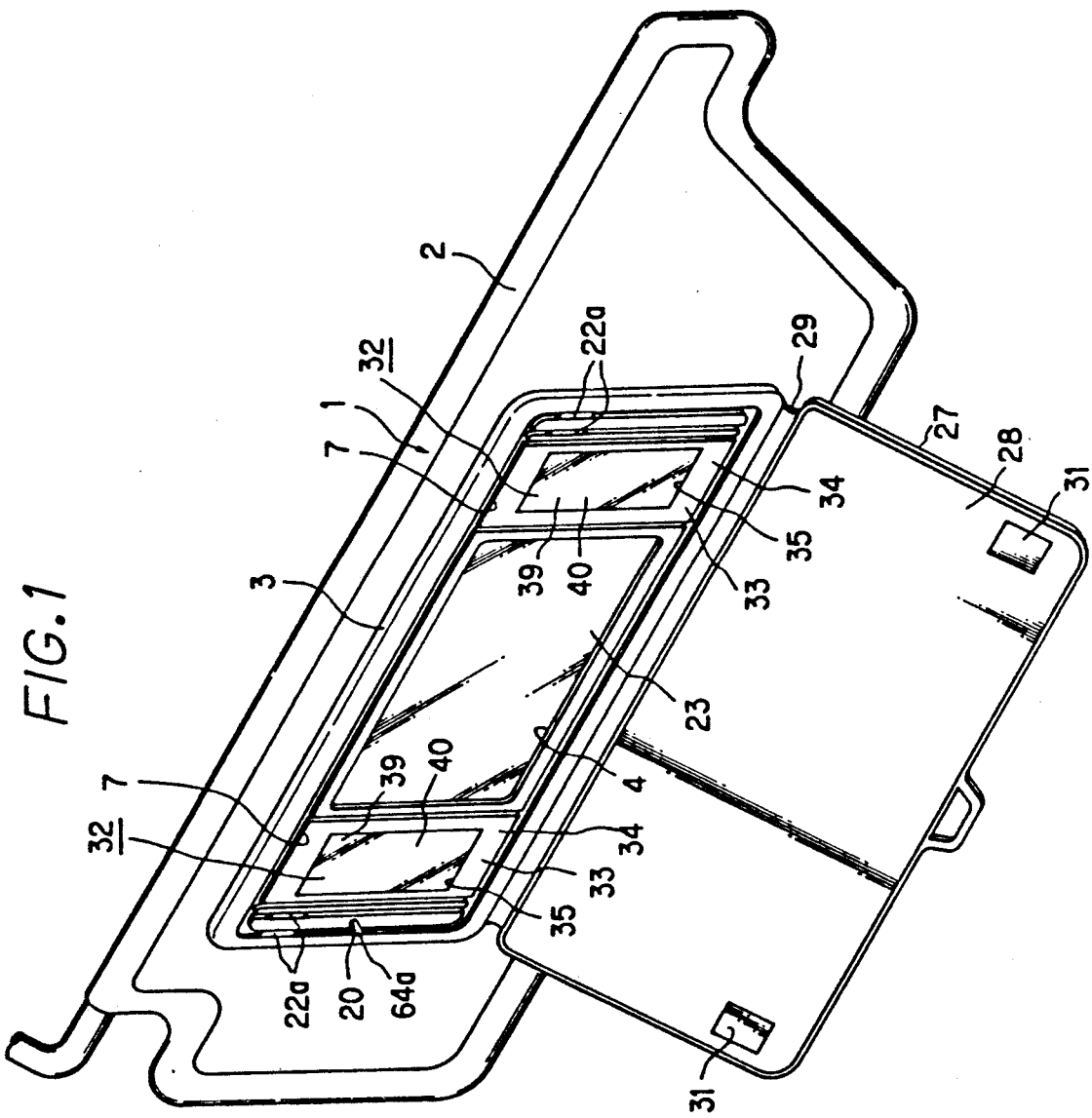
FIG. 1 is schematic perspective view of a vanity mirror according to an embodiment of the invention.

Magnetic members 31 are respectively mounted on inner surface of the cover portion 28 as shown in FIG. 1, and the cover 27 is adapted to be maintained at closed position with the magnetic members 31 being attracted to the tip ends 22a of the yoke plates 22 which project through the slits 19 to the front surface of the body 3.

Illuminating Portion of Vanity Mirror

Illuminating portions 32 are provided on both side portions of the mirror 23 respectively. Since the illuminating portions 32 are identical, the description will be made with respect to one of them.

Decorative Panel

Shown at 33 in FIGS. 1, 2, 5 and 7 is a decorative panel formed of a synthetic resin material.

The decorative panel 33 comprises a main panel 34 adapted to be fitted snugly in the front portion of the recessed portion 7 of the body 3 and having a vertically elongated rectangular opening 35.

Supporting walls 36 are formed to project from the rear surface of the main panel 34 as clearly shown in FIG. 7, and engaging openings 36a are formed in the supporting walls 36. The height or width of the supporting walls 36 in fore and aft directions decrease in tapered fashion in vertically downward direction.

Engaging projections 37 are formed on the upper end of the rear surface of the main panel 34 and, as shown in FIG. 5, engaging pawl pieces 38 having on the lower tip ends engaging pawls 38a are formed on the lower end of the main panel 34.

Light Conducting Plate

Shown at numeral 39 is a transparent light conducting plate having a generally wedge shaped cross-section as shown in FIG. 5, and is formed of a thermoplastic synthetic resin material of good transparency and high molding property such as acrylic resin or polycarbonate resin and by injection molding process.

There is formed on the front surface of the light conducting plate 39 a plate like projecting portion 40 for snugly fitting in the opening 35 in the decorative panel 33. A stepped surface 41 is defined around the periphery of the projecting portion 40 as shown in FIG. 7.

Engaging projections 42 are formed on left and right side surfaces of the light conducting plate 39 as shown in FIG. 7.

The light conducting plate 39 has an upper end surface 43 of a concave form curved upward and forward as shown in FIG. 5, which acts as a light receiving surface.

A plurality of minute notches 44 are formed in the rear surface of the light conducting plate 39.

The light conducting plate 39 is inserted between the supporting walls 36 of the decorative panel, then the engaging projections 42 of the light conducting plate 39 engage with the engaging openings 36a in the decorative panel and, the projecting portion 40 of the light conducting plate 39 is fitted in the opening 35 in the decorative panel 33.

Shown at 45 is a reflective paper of a white color and consists of a main portion 45a facing the rear surface of the light conducting plate 39 and left and right side portions 45b facing respectively the outer side surfaces of the supporting walls 36 and 36.

Light Source Unit

Figure 6:
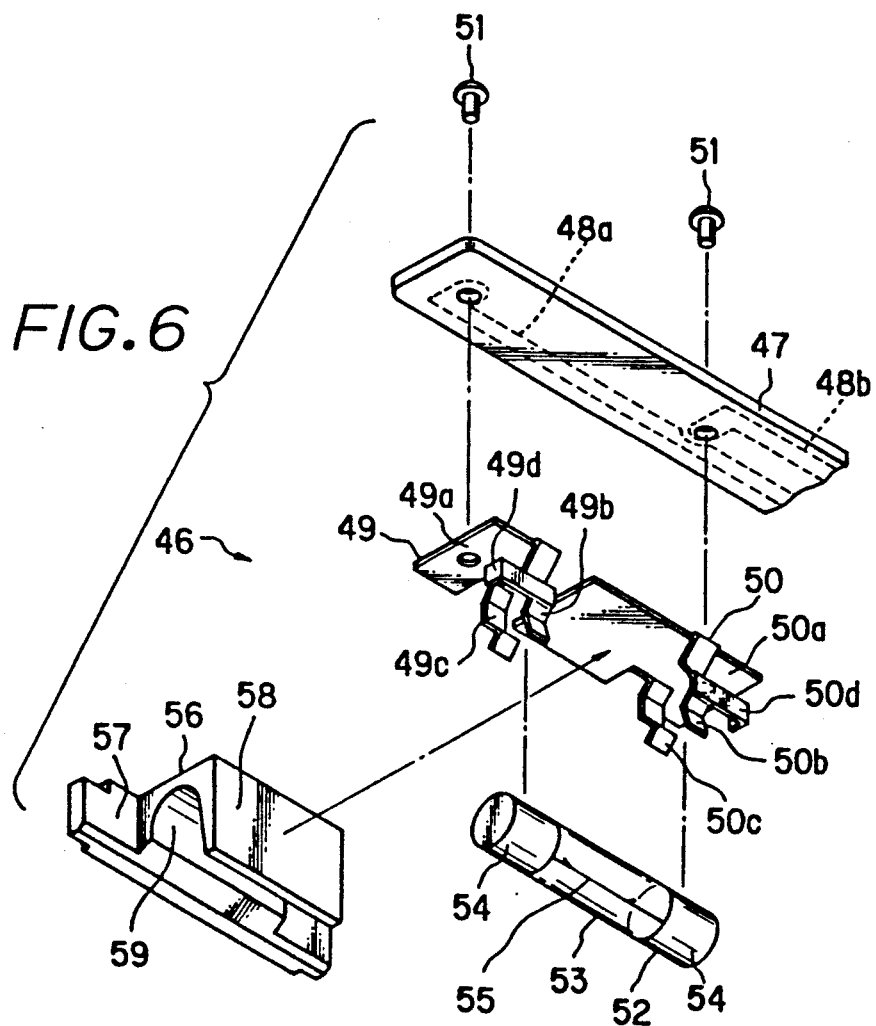
FIG. 6 is an exploded perspective view of essential portion of the vanity mirror of FIG. 1.

A light source unit 46 comprises a printed circuit board 47, terminal members 49 and 50, a reflective mirror 56 and a tubular bulb 52 as shown in FIG. 6.

The printed circuit board 47 has elongated plate like shape with two conductors 48a and 48b being provided.

The terminal members 49 and 50 are connected to opposite end portions of the printed circuit board 47 respectively, and comprise respectively base portions 49a and 50a, and clamping pieces 49b, 49c and 50b, 50c projecting downward from front and rear edges of the base portions 49a and 50a. The terminal members 49 and 50 are respectively formed integrally of a material having electroconductive and resilient property. The clamping pieces 49b, 49c and 50b, 50c oppose with each other with a predetermined space being formed therebetween. The terminal members 49 and 50 are respectively connected to the printed circuit board 47 with the base portions 49a and 50a being connected through electro-conductive rivets 51 respectively. The base portions 49a and 50a and the rivets 51 and 51, and the rivets 51 and the conductors 48a and 48b are respectively connected electrically by soft solder.

There are formed respectively locating portions 49d and 50d on the upper clamping pieces 49b and 50b to project therefrom in opposite directions with the tip ends thereof being bent downward.

Both of the printed circuit boards 47 are located on the lower surface of the wall 10 of the body 3 as shown in FIGS. 5 and 9, with the front edges of the printed circuit boards 47 being clamped between the ridges 11 and the wall 10 respectively, with the terminal members 49 and 50 of one of the light source units 46 being located on the upper end portion of one of the recessed portions 7 through the cutout portion 8, and the other light source units 46 being located on the upper end portion of the other recessed portions 7 through the cutout portion 8 respectively.

The tubular bulb 52 comprises a tubular glass tube 53, sockets 54 mounted respectively on opposite end portions of the glass tube 53, a filament 55 disposed in the glass tube 53 and connected to the sockets 54 and the like.

The reflective mirror 56 is formed of heat resistant material such as silicone rubber as is colored white to improve heat reflecting property, and the reflective mirror 56 has integrally a reflecting portion 58 and a base portion 57.

The base portion 57 has a plate-like form elongated in transverse directions with the length thereof being larger than the space between the clamping pieces 49b and 49c of the terminal member 49 and the clamping pieces 50b and 50c of the terminal member 50.

The reflecting portion 58 has a generally elongated block like form having in the lower surface an inverted U-shaped groove 59 therein, with the rear surface being integrally connected to the front surface of the base portion 56, and the length thereof being smaller than that of the base member. The surface of the groove 59 acts as the light reflecting surface.

The reflective mirror 56 is located so that the upper surfaces of left and right ends of the base portion 56 contact with the lower surfaces of the lower clamping pieces 49c and 50c respectively and the reflecting portion 58 is between the clamping pieces 49b and 49c and the clamping pieces 50b and 50c respectively, and the sockets 54 of the tubular bulb 52 are clamped between the clamping pieces 49b and 49c and the clamping pieces 50b and 50c respectively. Thus, the displacement of the reflective mirror 56 in the downward direction is prevented by the glass tube 53 of the tubular bulb 52 which may contact with the reflective potion 58. And further, the displacement of the reflective mirror 56 in left and right directions is prevented since the reflecting portion 56 is located between the clamping pieces 49b and 49c and the clamping pieces 50b and 50c.

The locating portions 49d and 50d on the clamping pieces 49b and 50b act to prevent the displacement of the tubular bulb in left and right directions.

Shown at numerals 60 and 61 are contact members formed of electro-conductive material, and respectively consist of contact pieces 60a and 61a and contact pieces 60b and 61b as shown in FIG. 9.

The contact pieces 60a and 61a are respectively formed integrally of main portions having the width adapted to be fitted in the grooves 15 and 15' being formed in the rear surface of the body 3, and mounting pieces formed to project from the right end portions (as viewed from the rear) of the main portions. By inserting mounting screws 62 through openings in the mounting pieces and threadingly inserting through prepared holes 16 and 16' in the projecting portion 14 on the rear surface of the body 3, the contact pieces 60a and 61a are secured on the rear surface of the body 3, with major portions of the main portions being fitted in the grooves 15 and 15' respectively. The left end portions as viewed in FIGS. 3 and 9 project leftward from the left end of the projecting portion 14 and the left end portion as viewed from rear projects leftward from the left end of the projecting portion 14 and is located in the central portion of the gate-shaped projection 17 so as to form a connector portion 63 consisting of the contact pieces 60a and 61a, the gate-shaped projection 17, and the projecting portions 18. The connector portion 63 is adapted to be connected to an outer connector not shown in the drawings.

The connecting piece 60b extends upward from the right end of the contact piece 60a with the upper end thereof being connected to the conductor 48a of the printed circuit board. Further, the connecting piece 61b is connected to the conductor 48b of the printed circuit board 47 through a switch 64.

The switch 64 is disposed on the right end portion of the rear surface of the body 3 as viewed from the rear and generally vertically intermediate position. The switch 64 has an actuating portion 64a projecting from the front surface of the body 3 through the inserting opening 20. When the cover portion 28 of the cover 27 is positioned to cover the front surface of the body 3, the actuating portion 64a is pushed rearward by the cover portion 28 thereby the conductor 48b is disconnected from the contact piece 61a and tubular bulbs 52 and 52 are distinguished. When the cover portion 28 of the cover 27 is moved from the front surface of the body 3, the actuating portion 64a projects from the front surface of the body 3 and the conductor 48b is connected with the contact piece 61a and tubular bulbs 52 are lighted.

Mounting Decorative Panel, Light Conducting Plate

The engaging pawls 37 of the decorative panels 33 mounting thereon the light conducting plates 39 respectively are engaged with the rear sides of the upper edges of the openings in the recessed portions 7 through the upper end portions of the cutouts 8 (FIG. 7) and then, the lower end portions of the decorative panels 33 are pushed rearward. The engaging pawl pieces 38 are inserted into engaging openings 9 in the body 3, and engaging pawls 38a are engaged with the rear edges of the engaging openings 9 thereby the light conducting plates 39 and 39 are located in the recessed portions 7 and 7 of the body 3 through the decorative panels 33 and the light receiving surfaces 43 of the light conducting plates 39 are located to face the tubular bulbs 52 respectively.

When the bulbs 52 are lighted, the light emitted from the bulbs is injected directly, or through the reflecting surfaces 59 of the reflective mirrors 56, into the light conducting plates 39, and is directed forward from the front surfaces of the light conducting plates 39. The notches 44 in the rear surfaces of the light conducting plates 39 and the reflective papers 45 act to intensify the light emitted from the light conducting plates 39.

ADVANTAGES OF THE INVENTION

According to the invention, a light conducting plate is disposed in a recessed portion in the body of the vanity mirror with an electric bulb being disposed to oppose one side surface of the light conducting plate. As a result, it is possible to reduce the thickness of the vanity mirror, and since the front surface of the light conducting plate is exposed to the outside it is not required to provide a lens or the like which enables to reduce the number of constituting parts.

Further, by providing a decorative panel adapted to be detachably mounted on the body and to mount detachably thereon the light conducting plate, it is possible to mount the decorative panel and the light conducting plate as a sub-assembly. As a result component control such as transportation and storage and the assembling process is simplified.

Further, the reflective sheet mounted on the rear surface of the light conducting plate increases the light emitted from the light conducting plate and the light emitted from the light source is utilized effectively.

Further, the combination of the tubular electric bulb and the reflective mirror disposed to surround the bulb at the side opposite to the side facing the light conducting plate enables to increase the light directed to the light conducting plate. As a result, the light emitted from the light source is further utilized effectively.

SECOND EMBODIMENT

Figure 10:
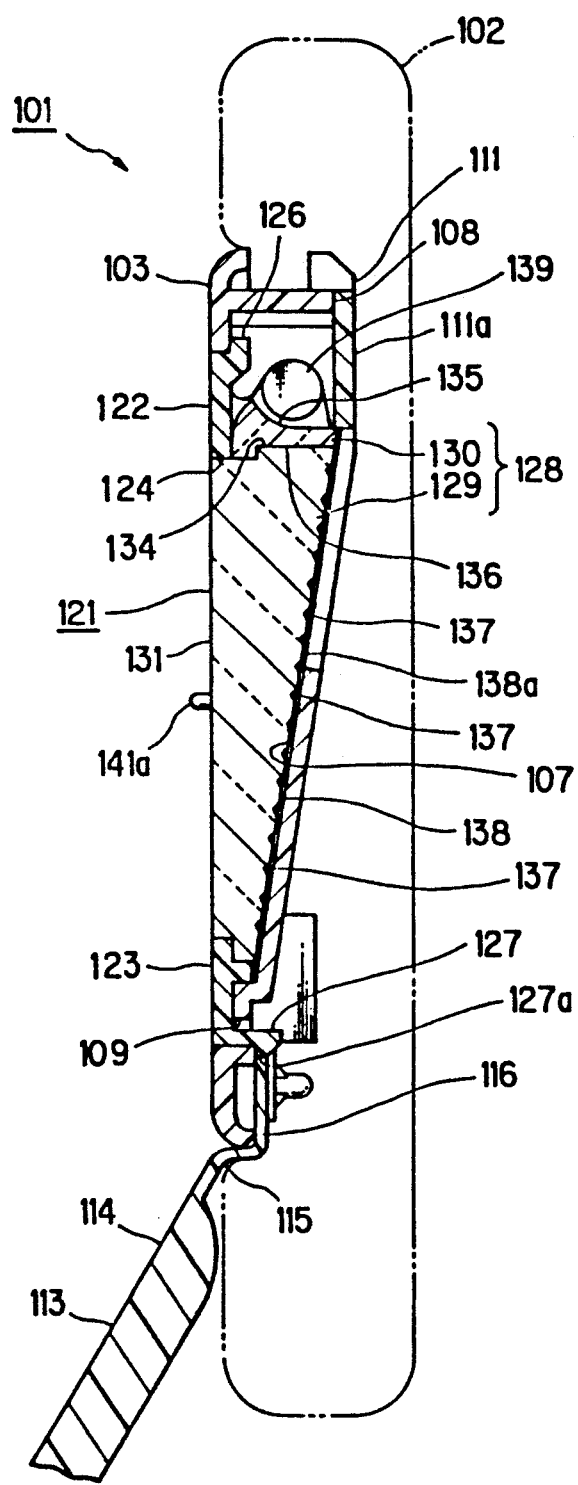
FIG. 10 is a view similar to FIG. 5 but showing a second embodiment.
Figure 11:
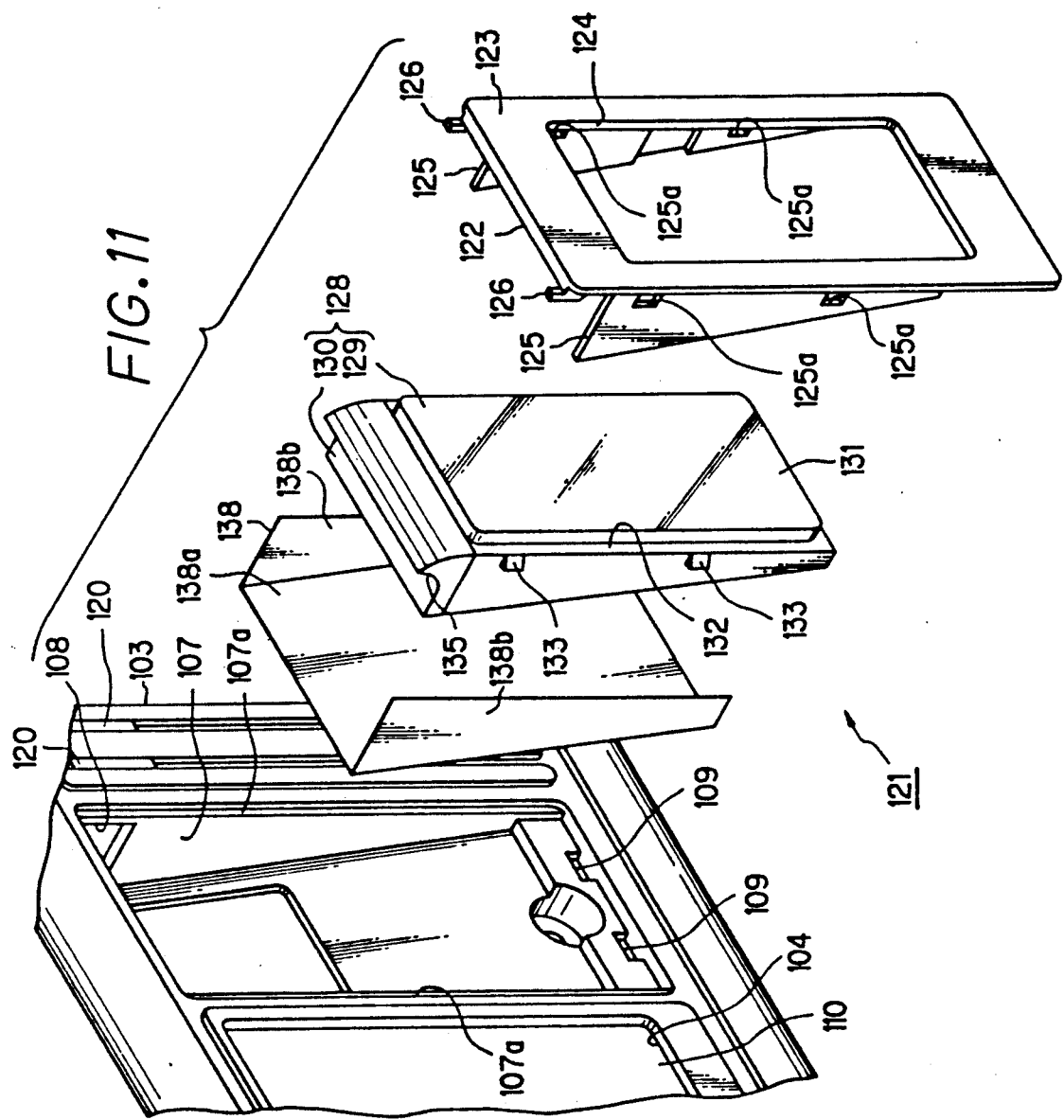
FIG. 11 is a view similar to FIG. 7 but showing the second embodiment.

FIG. 10 through FIG. 11 show a second embodiment of the invention. The drawings are generally similar to FIG. 5, FIG. 7 and FIG. 8 of the first embodiment, but the reference numerals differ therebetween.

Outline

A vanity mirror 101 according to the second embodiment is mounted on a sun visor 102 and comprises a body 103 having a window 104, recessed portions 107 (only one is shown), cutout 108, engaging openings 109 and 109; a mirror 110; a back cover 111 having projecting portions 111a and 111a; a front cover 113 having a cover portion 114, a hinge portion 115 and a mounting portion 116; an illuminating portion 121; and a decorative panel 122 having a main panel 123, an opening 124, supporting walls 125, engaging openings 125a, engaging projections 126, engaging pawls 127, engaging pawls 127a. The construction and function of these components are generally similar to that of the first embodiment, and detailed description is omitted.

The vanity mirror further comprises a transparent light conducting plate 128 which differs from that of the first embodiment.

In particular, the plate 128 consists of a light emitting portion 129 and a light receiving portion 130. However, the light conducting plate 128 is generally similar to that of the first embodiment such as a plate like projecting portion 131, stepped surface 132, engaging projections 133 curved light receiving surface 135, minute notches 137, and white reflective paper 138 having a main portion 138a and left and right pieces 138b.

Figure 12:
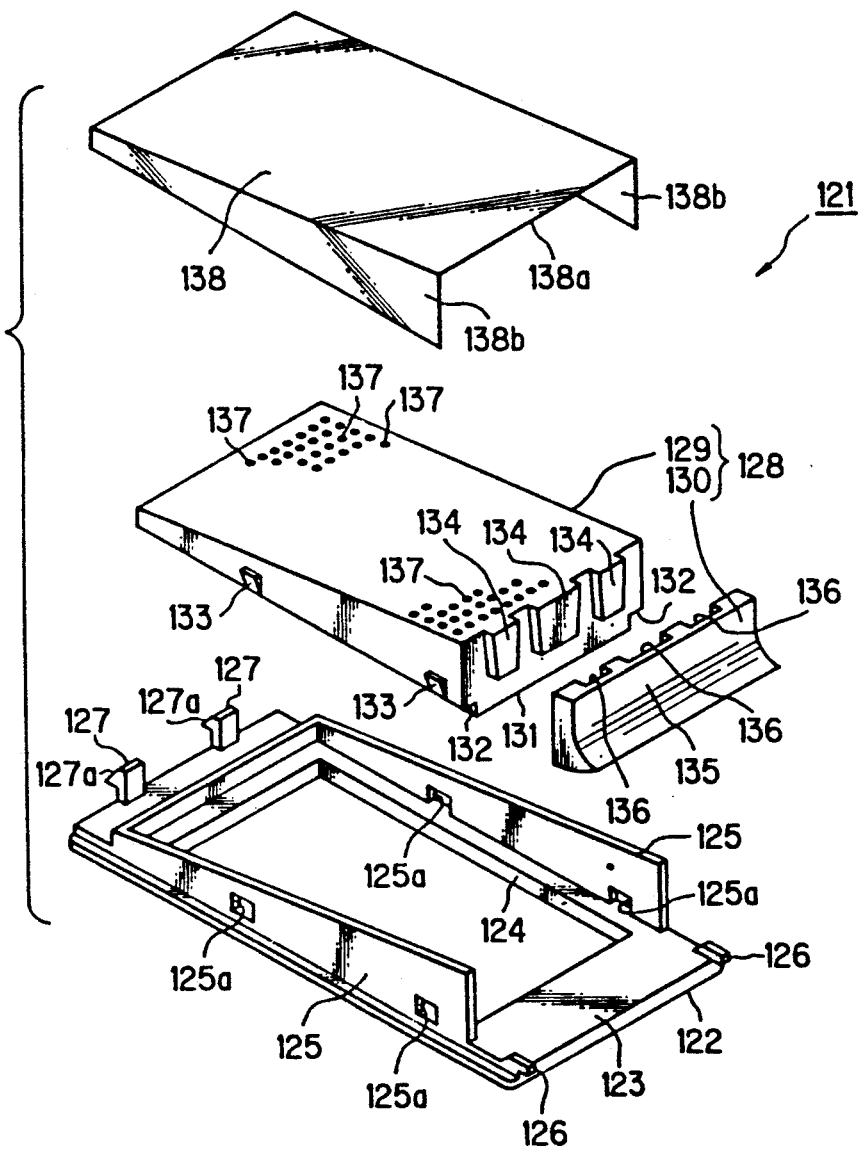
FIG. 12 is a view similar to FIG. 8 but showing the second embodiment.

The light emitting portion 129 is formed to have on the upper end surface engaging projections 134 with the width of which, as shown in FIG. 12, being increased in the rear direction.

The light receiving portion 130 has engaging cutouts 136 corresponding the engaging projections 134 respectively.

By inserting the engaging projections 134 of the light emitting portion 129 with the engaging cutouts 136 of the light receiving portion 130 from the rear, the light emitting portion 129 is firmly connected to the light receiving portion 130.

According to the second embodiment of the invention, the light receiving portion 130 is formed of a high heat resisting thermoplastic synthetic resin material such as polycarbonate resin and by blow molding process. And the light emitting portion 129 is formed of a thermoplastic synthetic resin material of good transparency and high molding property such as acrylic resin and by injection molding process.

Shown at 139 in FIG. 10 is a tubular bulb acting as a light source.

Thus, the light receiving portion 130 is not affected by the heat, and the light emitting portion 129 enables the thermal loss and obtain desired illuminance.

While the invention has been illustrated and described as embodied in specific examples of the illuminating portion of a vanity mirror, it is not intended to be limited to the details shown, since various changes and modifications in structure and configuration may be made without departing in any way from the spirit of the present invention.

What is claimed is:

1. An illuminating portion of a vanity mirror device comprising:

a recessed portion formed at one side of a mirror in a body of the device, a light conducting plate formed of a transparent material being fitted in the recessed portion with the front surface of the light conducting plate being located flush with the front surface of said body, said light conducting plate being formed of a light receiving portion and a light emitting portion secured firmly to the light receiving portion in face to face relationship, and the light receiving portion is formed of a thermoplastic synthetic resin material of a high degree of heat resistance and the light emitting portion is formed of a thermoplastic synthetic resin material of high degree of transparency and good moldability, an electric bulb being located to oppose one of end surfaces of the light conducting plate, a decorative panel having therein a large opening and being detachably mounted on said body so as to be located at said recessed portion, and said light conducting plate being retained in said opening at said decorative panel and supported therein such that said front surface of said light conducting plate is exposed to the outside.

2. An illuminating portion of a vanity mirror device comprising a recessed portion in a body of the device and at one side of a mirror, a light conducting plate formed of a transparent material being fitted in the recessed portion with the front surface of said light conducting plate being located flush with the front surface of the body, and an electric bulb being located to oppose one of end surfaces of said light conducting plate and wherein the light conducting plate is formed with a light receiving portion and a light emitting portion secured firmly to the light receiving portion in face to face relationship, and the light receiving portion is formed of a thermoplastic synthetic resin material of a high degree of heat resistance and the light emitting portion is formed of a thermoplastic synthetic resin material of a high degree of transparency and good moldability.

* * * * *